United States Patent
Ioppolo et al.

(10) Patent No.: US 10,160,350 B2
(45) Date of Patent: Dec. 25, 2018

(54) ADJUSTING DEVICE FOR LONGITUDINAL ADJUSTMENT OF A VEHICLE SEAT AND METHOD FOR ASSEMBLY

(71) Applicant: Brose Fahrzeugteile GmbH & Co. KG, Coburg, Coburg (DE)

(72) Inventors: Leo Ioppolo, Washington Twp, MI (US); Paul Herr, Fraser, MI (US)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 14/754,841

(22) Filed: Jun. 30, 2015

(65) Prior Publication Data

US 2017/0001542 A1 Jan. 5, 2017

(51) Int. Cl.
*B60N 2/07* (2006.01)

(52) U.S. Cl.
CPC ......... *B60N 2/0727* (2013.01); *B60N 2/0705* (2013.01); *B60N 2/073* (2013.01); *B60N 2/0715* (2013.01); *B60N 2/0722* (2013.01)

(58) Field of Classification Search
CPC .. B60N 2/0727; B60N 2/0705; B60N 2/0722; B60N 2/073; B60N 2/0825; B60N 2/0818
See application file for complete search history.

(56) References Cited

U.S. PATENT DOCUMENTS

| | | | | |
|---|---|---|---|---|
| 4,508,385 A | * | 4/1985 | Bowman | B60N 2/0715 248/429 |
| 4,811,925 A | * | 3/1989 | Fujita | B60N 2/0707 248/430 |
| 5,797,575 A | * | 8/1998 | Clausen | B60N 2/0705 248/429 |
| 6,089,521 A | * | 7/2000 | Tarusawa | B60N 2/0705 248/430 |
| 6,322,035 B1 | * | 11/2001 | D'Antimo | B60N 2/0715 248/393 |
| 6,364,272 B1 | * | 4/2002 | Schuler | B60N 2/072 248/424 |

(Continued)

FOREIGN PATENT DOCUMENTS

| CN | 101522463 | 9/2009 |
|---|---|---|
| CN | 202641425 | 1/2013 |

(Continued)

OTHER PUBLICATIONS

Official Action for corresponding Chinese Patent Application No. 201610510794.5 dated Oct. 17, 2018.

*Primary Examiner* — Jonathan Liu
*Assistant Examiner* — Taylor L Morris
(74) *Attorney, Agent, or Firm* — Renner, Otto, Boisselle & Sklar, LLP

(57) ABSTRACT

An adjusting device for longitudinal adjustment of a vehicle seat comprises a lower rail 2 and a second rail 1 movably guided relative to the first rail. A first end stop 4 is supported on the second rail 1 or on the first rail 2 at a central position so as to be displaceable in the longitudinal direction, for defining the front end position and/or rear end position of the second rail 1 by cooperation with the first rail 2 or the second rail 1 and edges of a retainer cage 6 used for accommodating bearing members. According to the invention the total travel range of the adjusting device can be extended, because the central end stop can be displaced in longitudinal direction.

17 Claims, 12 Drawing Sheets

(56) References Cited

U.S. PATENT DOCUMENTS

| | | | | |
|---|---|---|---|---|
| 6,688,574 B2* | 2/2004 | Okazaki | | B60N 2/0705 248/424 |
| 6,892,995 B2* | 5/2005 | Tame | | B60N 2/0705 248/429 |
| 7,097,250 B2 | 8/2006 | Rausch et al. | | |
| 7,503,614 B2* | 3/2009 | Yamada | | B60N 2/0705 248/429 |
| 7,658,360 B2* | 2/2010 | Kojima | | B60N 2/0705 248/424 |
| 7,758,008 B2* | 7/2010 | Kojima | | B60N 2/0818 248/429 |
| 7,815,159 B2* | 10/2010 | Moriyama | | B60N 2/0727 248/430 |
| 7,992,834 B2* | 8/2011 | Kojima | | B60N 2/0727 248/424 |
| 8,033,520 B2* | 10/2011 | Fujieda | | B60N 2/0727 248/430 |
| 8,172,192 B2* | 5/2012 | Hofmann | | B60N 2/0705 248/424 |
| 8,251,335 B2* | 8/2012 | Kojima | | B60N 2/0727 248/424 |
| 8,251,336 B2* | 8/2012 | Kimura | | B60N 2/0705 248/424 |
| 8,668,180 B2* | 3/2014 | Shiraki | | B60N 2/0705 248/424 |
| 8,678,336 B2* | 3/2014 | Couasnon | | B60N 2/0727 248/429 |
| 8,695,937 B2* | 4/2014 | Yamada | | B60N 2/0727 248/429 |
| 2002/0179800 A1* | 12/2002 | Flick | | B60N 2/0705 248/429 |
| 2005/0184551 A1* | 8/2005 | Nihonmatsu | | B60N 2/0825 296/65.13 |
| 2005/0230591 A1* | 10/2005 | Smith | | B60N 2/0705 248/429 |
| 2007/0158987 A1* | 7/2007 | Hayakawa | | B60N 2/0705 297/344.11 |
| 2009/0267396 A1* | 10/2009 | Hofmann | | B60N 2/0705 297/344.1 |
| 2010/0098357 A1* | 4/2010 | Beneker | | B60N 2/0705 384/34 |
| 2011/0101194 A1 | 5/2011 | Wetzig et al. | | |
| 2011/0240821 A1 | 10/2011 | Couasnon et al. | | |
| 2012/0074287 A1* | 3/2012 | Wojatzki | | B60N 2/0818 248/429 |
| 2012/0168596 A1* | 7/2012 | Ishimoto | | B60N 2/071 248/430 |
| 2012/0205512 A1* | 8/2012 | Fujishiro | | B60N 2/0705 248/429 |
| 2013/0020459 A1* | 1/2013 | Moriyama | | B60N 2/01 248/636 |
| 2013/0075571 A1* | 3/2013 | Suck | | B60N 2/072 248/430 |
| 2014/0110554 A1* | 4/2014 | Oya | | B60N 2/0705 248/430 |

FOREIGN PATENT DOCUMENTS

| | | |
|---|---|---|
| DE | 102004044716 | 3/2006 |
| DE | 102006061596 | 7/2007 |
| DE | 202006016652 | 4/2008 |
| DE | 102008012213 | 9/2009 |
| DE | 102011081107 | 2/2013 |

* cited by examiner

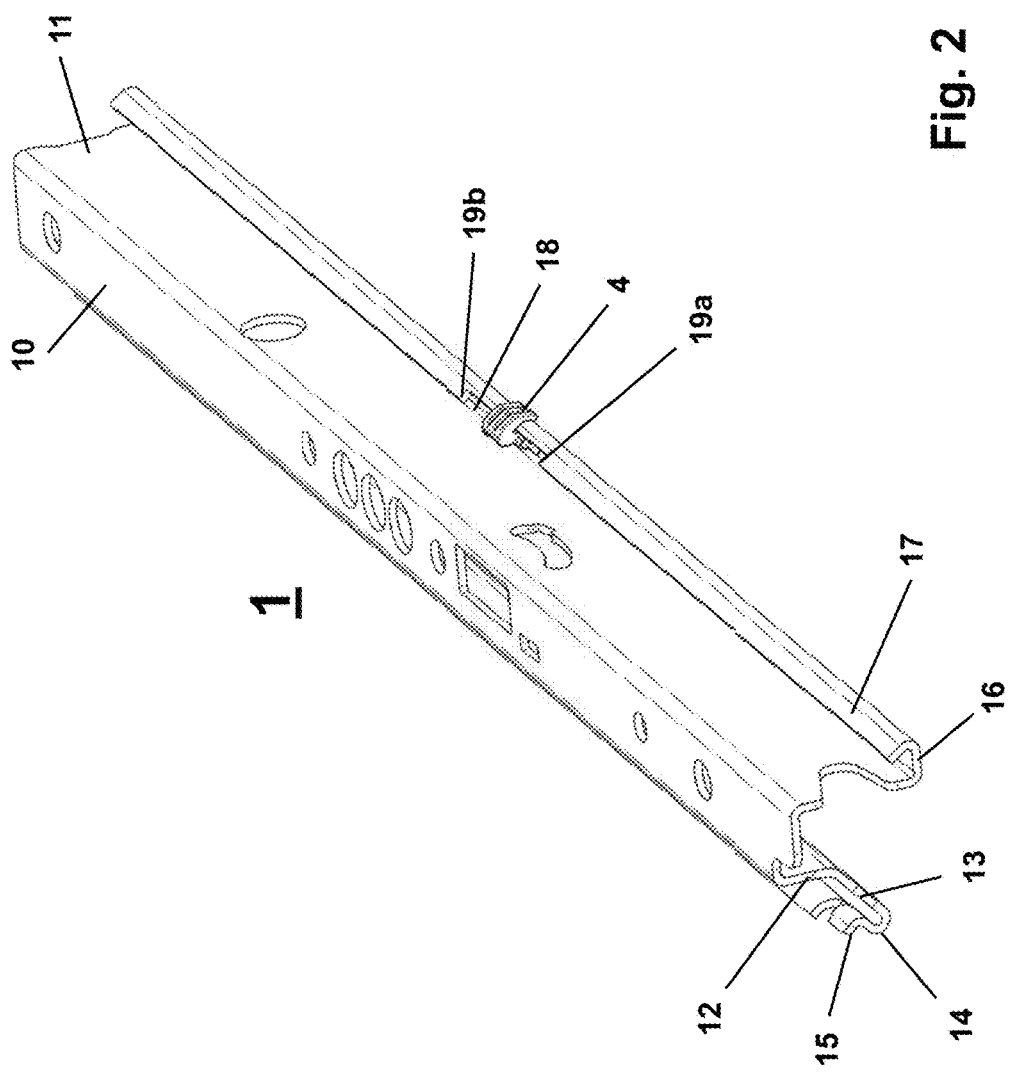

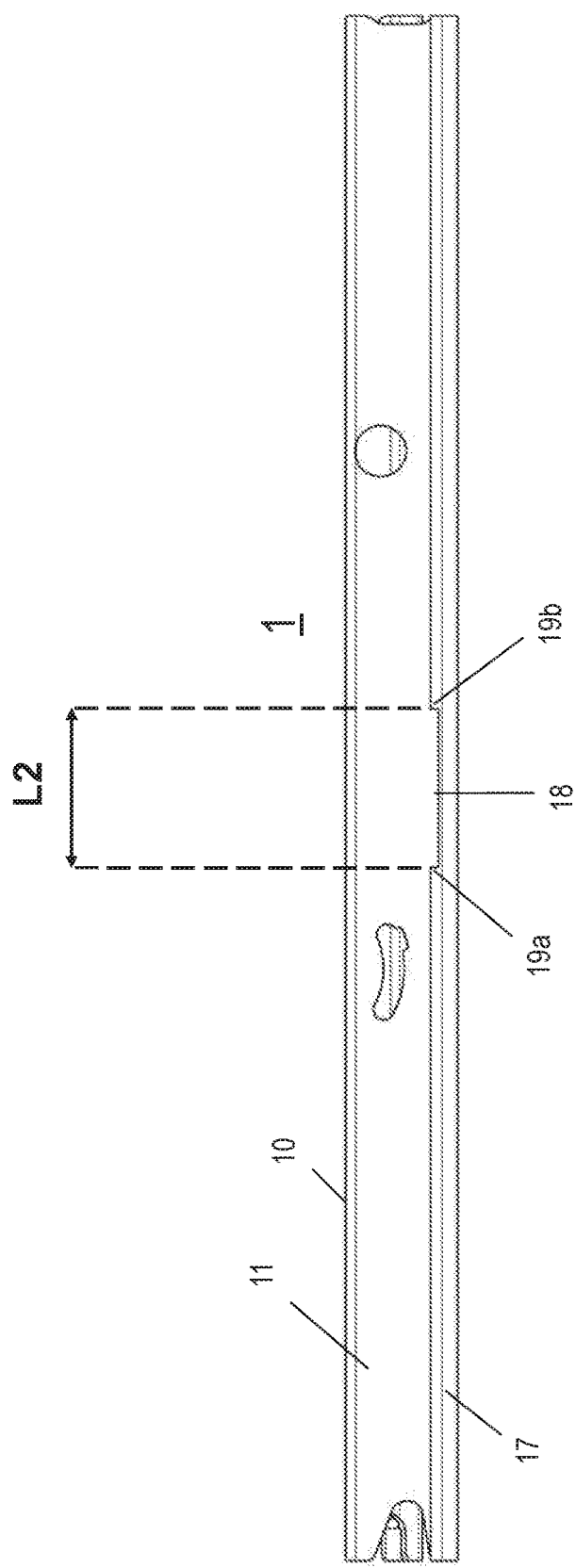

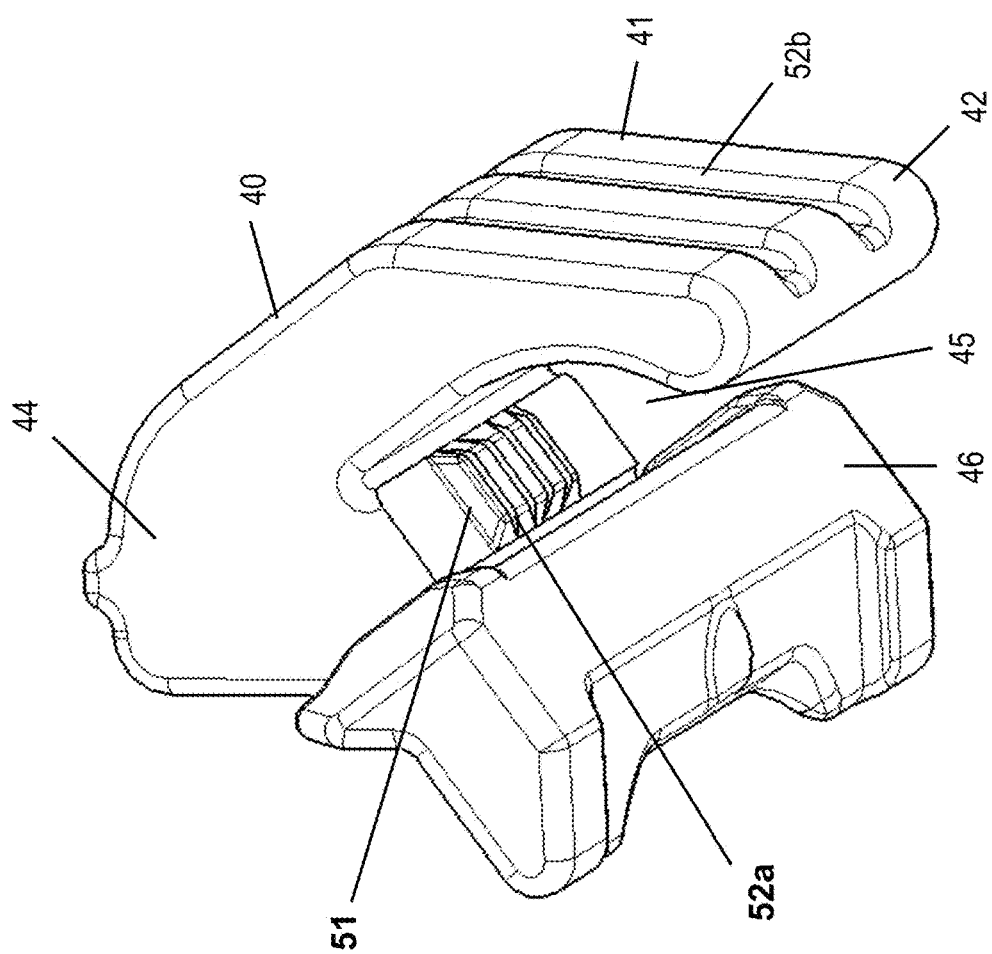

ADJUSTING DEVICE FOR LONGITUDINAL ADJUSTMENT OF A VEHICLE SEAT AND METHOD FOR ASSEMBLY

FIELD OF INVENTION

The present invention relates to an adjusting device for longitudinal adjustment of a vehicle seat, particularly of a motor vehicle seat, and to a method for assembly of such an adjusting device.

BACKGROUND

A conventional adjusting device for longitudinal adjustment of a vehicle seat comprises an upper rail, which supports the vehicle seat, and a lower rail, which is usually fixed to the bottom of the passenger compartment of a vehicle. The upper rail can be adjusted relative to the fixed lower rail in longitudinal direction for adjusting the longitudinal position of the vehicle seat as desired by the user. For reliably defining the end positions of the upper rail, end stops are used. In general the adjusting device shall be as light-weight as possible while ensuring a noise-free adjusting and a high mechanical stability, particularly in the event of a side crash and front crash, where high lateral and vertical loads act on the rails of the adjusting device. A stable support of the vehicle seat is desired in any longitudinal position of the upper rail, particularly also in the extreme positions, i.e. the full forward and full rearward position of the upper rail.

FIG. 1a shows a conventional upper rail 110 having a rectangular cross-section, comprising a base leg 111, a side wall 112 and a lateral bearing area 113 formed by a slanted leg of the profile. As shown in FIG. 1a, end stops 114 are punched out of the lateral bearing area 113 and bent upward. The adjusting device of FIG. 1b further comprises a lower rail 120 having a rectangular cross-section, comprising a bearing area 121, which together with the bearing area 113 of the upper rail 110 supports bearing members, such as steel balls or rollers, which may be accommodated in a retainer 122, such as a bearing cage, and serve for reducing friction between the two rails 110, 120 and ensuring a comfortable, noise-free and rattle-free adjustment of the upper rail 110 relative to the lower rail 120. By cooperation of the end stops 114 with the lower rail 120 the full forward position and full rearward position of the upper rail 110 is defined. Particularly, the end stops 114 together with retainer 122 abut against parts of the opposite lower rail 120 in the extreme positions. Thus, the total travel range of the adjusting device is limited by the fixed positions of the end stops 114 and is usually reduced to a distance shorter than the total length of the upper rail 110 and lower rail 120, respectively.

Instead of forming such end stops integrally with the respective rail and subsequent processing thereof, such as punching and bending, DE 102008012213 A1 discloses an end stop member of an adjusting device for longitudinal adjustment of a vehicle seat, which can be fixed as a separate member at an appropriate position on the upper or lower rail and suitably protrudes into the gap between the two rails to form an end stop at a respective extreme position of the adjusting device. The total travel range of the adjusting device is, however, limited by the fixed positions of the end stop members and cannot be extended beyond the total length of the upper rail and lower rail, respectively.

US 2011/0101194 A1 discloses another example of an adjusting device comprising end stop members that are fixed as separate members to one of the rails and protrude into the gap between the two rails so as to obstruct a further adjustment of the respective rail beyond the extreme position defined by the respective end stop.

US 2007/0158987 A1 discloses an adjusting device, wherein two oblong retainers are arranged between the lower rail and the upper rail along a longitudinal direction thereof, each comprising a central notch and expanded bearing portions at a front end and rear end of the oblong retainer, for accommodating and supporting steel balls serving as bearing members. The positions of the oblong retainers are fixed by bent, stationary tabs, which are punched out of the lateral bearing area of the upper rail and afterwards bent so as to obstruct a further adjustment of the oblong retainers beyond the positions defined by the tabs. The total travel range of the adjusting device is, however, limited by the fixed positions of the end stop members and cannot be extended.

In the market, there exists the need for adjusting devices enabling an extended travel range at a total length of the rails as short as possible, in order to enable as light-weight adjusting devices as possible, which nevertheless are stable enough to offer sufficient reliability in daily use and security in extreme situations, particularly in the event of a crash.

SUMMARY OF INVENTION

Accordingly, it is an object of the present invention to provide an enhanced adjusting device for longitudinal adjustment of a vehicle seat, enabling an extended travel range at low costs, an enhanced vertical stability and an enhanced strength, particularly in the case of a front or side impact, such as in the event of a front or side crash. It is a further object of the present invention to provide an easy and reliable method for assembly of such an adjusting device at low costs.

This problem is solved by an adjusting device for longitudinal adjustment of a vehicle seat as claimed in claim 1 and by a method for assembly of such an adjusting device as claimed in claim 16. Further advantageous embodiments are the subject-matter of the dependent claims.

According to the present invention there is provided an adjusting device for longitudinal adjustment of a vehicle seat, particularly of a motor vehicle seat, comprising: a first rail and a second rail, which is movably guided in a longitudinal direction relative to the first rail, and at least one end stop for defining a front end position or a rear end position of the second rail relative to the first rail, wherein a first end stop is supported on the second rail or on the first rail so as to be displaceable in the longitudinal direction, for defining the front end position and/or rear end position of the second rail by cooperation with the first rail or the second rail.

Preferably, the first rail is the lower rail of the adjusting device and is fixed to the bottom of the passenger compartment of the vehicle, whereas the second rail is the upper rail of the adjusting device fixedly connected with the bottom of the vehicle seat to be supported. Both the upper rail and the lower rail have a predetermined total length and can be used for the longitudinal adjustment over their entire length, because the end stop members are not formed as part of these rails at a respective end portion thereof. According to the invention the total travel range of the second (e.g. upper) rail relative to the first (e.g. lower) rail can be further extended because the at least one end stop is not stationary at a fixed position but can instead be displaced in longitudinal direction relative to the associated rail on which it is displaceably supported. For this purpose the total travel range of the first end stop is limited, preferably by the configuration of the associated rail on which it is displaceably supported, e.g. by protrusions formed integrally with the associated rail or attached thereto, or by edges of a recess or window formed in the associated rail at a suitable position and serving as a stop for the displaceable at least one end stop.

According to the present invention additional members or structures serving for preventing that a respective end of a retainer, such as a bearing cage for accommodating steel balls, projects beyond the respective end of the associated rail are not required so that the total active length of the rails over which the rails can be adjusted is longer as compared to conventional rails. Therefore, forces can be spread onto a larger area so that reduced loads act on members such as end stops or bearing cages for bearing members, which can thus be formed at reduced costs, particularly of plastic material or resin.

Generally, the first end stop may be configured for defining only one of the extreme positions of the second rail, such as the full forward end position, whereas the other extreme position, such as the full rearward position, can also be defined in a conventional manner, e.g. by means of a conventional end stop member formed integrally with one of the rails or affixed thereto. Preferably, however, according to the invention the first end stop is configured for defining both extreme positions of the second rail.

According to a further embodiment the first end stop is provided in a central region of the adjusting device and extends transverse to the longitudinal direction in a gap between the first rail and the second rail. The total length of the first end stop in the transverse direction can thus be minimized, thereby reducing strain and enabling use of less costly materials and production methods. By disposing the first end stop in the central region, the extension of the total travel range of the first end stop may be maximized into both directions, i.e. the forward and rearward direction. At the same time, disposing the first end stop in the central region enables a simplified method for assembly of the adjusting device, as outlined below in more detail. In that regard "central" does not necessarily relate to the exact geometric middle of the associated rail, rather the first end stop may be supported a little distance before or behind the exact geometric middle of the associated rail.

According to a further embodiment the first end stop is moveably supported in a recess of the first rail or second rail extending in the longitudinal direction. The recess is not necessarily formed as a through-hole, rather a residual material thickness may be provided in the recess. Preferably, however, the recess is formed as a window or through-hole so that the first end stop may be supported on a first side of the associated rail and may extend through the recess and into the gap between the two rails, so that less strain on the first end stop may be accomplished. At the same time, the front edge and/or rear edge of the recess may serve as an end stop for defining extreme positions of the travel range of the first end stop on the associated rail. If the first end stop serves to define the most forward and rearward end position of the second rail, then the recess preferably is disposed mirror-symmetrically relative to the geometric middle of the associated rail.

According to a further preferred embodiment an oblong retainer (bearing cage) for accommodating bearing members is disposed between the first rail and the second rail, wherein the oblong retainer is supported so as to be displaceable in the longitudinal direction and the front end position and/or rear end position of the second rail is defined by cooperation of the first end stop with a respective end of the recess of the first rail or of the second rail and the oblong retainer.

The oblong retainer does not necessarily always accommodate bearing members, such as steel balls or rollers. As an example, if a fully manual adjustment of the longitudinal position is desired such bearing members may be provided to reduce friction, whereas, if the adjustment is performed by means of electric motors, such bearing members may be omitted because of the larger forces available. In any case the oblong retainer itself is displaced in the longitudinal direction when the position of the second rail relative to the first rail is adjusted so that the extreme position(s) of the adjusting device is defined by cooperation of the first end stop with a respective end of the recess of the first rail or of the second rail and with the oblong retainer. For this purpose, a recess is preferably also provided in the oblong retainer, which extends in the longitudinal direction and comprises a front and/or rear edge acting as another end stop for the first end stop, for defining the extreme position(s) to thereby enable a further extension of the total travel range of the adjusting device.

According to a further embodiment the recess extending in the longitudinal direction is formed in a sidewall of a lateral bearing area of the second rail, so that the first end stop is supported on the second rail, which is usually the upper rail. As the bearing area is rather stiff and stable, the first end stop may be supported more reliably and stably. Furthermore, the bearing area of the second rail is usually in about the vertical middle of the adjusting device so that a symmetric transfer of forces may be accomplished.

According to a further embodiment the recess extending in the longitudinal direction is formed in the lateral bearing area of the second rail and the first end stop positively grips behind the lateral bearing area of the second rail so as to be displaceably supported on the second rail. This enables a mechanically more stable support of the first end stop with less strain on the second rail, as the first end stop may be supported more or less symmetrically on both sides of the lateral bearing area of the second rail. Preferably, the first end stop positively conforms to the side wall of the lateral bearing area as much as possible while enabling an adjustment of the longitudinal position of the first end stop member with suitable forces.

According to a further embodiment the second rail is an upper rail of the adjusting device and comprises a base leg, an L-leg projecting substantially perpendicularly, a connecting leg, which projects therefrom and extends in parallel with the base leg and a bearing leg, which extends relative to the connecting leg under an acute angle and towards an interior of the rail, wherein the lateral bearing area of the second rail is formed by the bearing leg of the second rail, and the first end stop positively grips behind the bearing leg. The second (upper) rail thus has a more or less rectangular profile. As the bearing leg is thus slanted downward, the end of the first end stop, which is remote to this bearing area, is thus pressed downward toward the horizontal bottom (base leg) of the second rail, thus enabling a more stable support of the first end stop on the second rail.

According to a further embodiment the first end stop comprises a base member and a supporting surface spaced apart from each other, for forming a guide channel enabling a more precise guidance of the first end stop along the second rail. As the base member is formed corresponding to the bearing leg of the second rail, a precise positive-fit support of the first end stop on the second rail is enhanced.

According to a further embodiment the base member comprises a slanted connecting leg and an embracing portion, for embracing an edge of the recess. The embracing portion thus enables a more precise positive gripping behind of the edge of the recess.

According to a further embodiment protrusions are formed on the supporting surface and/or on a bottom of the guide channel, for reducing friction between the first end stop and the bearing leg. The first end stop member may thus be more precisely and tightly mated to the bearing leg on which it is supported, thus enabling a more precise and reliable definition of the respective end position of the adjusting device.

According to a further embodiment the first end stop is integrally formed of a resin or plastic material and may thus be produced at low costs. At the same time resin or plastic material enables a reduced wear and thus a long lifetime and a high precision of the adjusting device, particularly during extended use.

According to a further embodiment the oblong retainer comprises a recess extending in the longitudinal direction, for defining the front end position and/or the rear end position of the second rail by cooperation with the first end stop. This recess may be open at one end of the oblong retainer, particularly if the first end stop is to define only one extreme position of the adjusting device.

According to a further embodiment the oblong retainer comprises a front side wall and a rear side wall, so that the recess, which extends in the longitudinal direction, is formed between the front side wall and the rear side wall of the oblong retainer. The length of the recess, which extends in the longitudinal direction, preferably corresponds to a maximum travel range of the second rail relative to the first rail. In comparison to a conventional oblong retainer having a recess, the length of the recess in the longitudinal direction is larger, due to the extended travel range enabled by the first end stop, the additional length provided substantially corresponding to the length of the recess defining the extreme position(s) of the first end stop.

According to a further embodiment the oblong retainer does not extend beyond a front edge or rear edge of the first rail or second rail in any of the end positions of the second rail. Thus, according to the present invention additional protective measures for protecting the front or rear end of the oblong retainer in the extreme position(s) of the adjusting device are not necessary.

According to a further aspect of the present invention there is provided a method for assembly of an adjusting device for longitudinal adjustment of a vehicle seat, comprising: providing a first rail and a second rail; providing an oblong retainer for accommodating bearing members; providing a first end stop; and inserting the first rail together with the oblong retainer into the second rail; said method further comprising inserting the first end stop into a gap between the first rail and second rail upon insertion of the first rail, so that the first end stop is supported on the second rail or on the first rail so as to be displaceable in the longitudinal direction relative to the second rail, for defining a front end position and/or rear end position of the second rail by cooperation with the first rail or the second rail.

According to a further embodiment of this method the first end stop is inserted into a recess of the first rail or of the second rail, said recess extending in the longitudinal direction.

According to a further embodiment of this method the recess extending in the longitudinal direction is formed in a lateral bearing area of the second rail, wherein the first end stop is inserted into the recess in such a manner that it positively grips behind the lateral bearing area of the second rail, so as to be displaceably supported on the second rail.

According to a further embodiment of this method the oblong retainer is provided with a recess extending in the longitudinal direction, and the step of inserting the first rail further comprises inserting the first end stop into the recess of the oblong retainer, so that the front end position and/or rear end position of the second rail is further defined by cooperation of the first end stop with the recess of the oblong retainer.

OVERVIEW ON DRAWINGS

Hereinafter, the invention will be described with reference to preferred exemplary embodiments and with reference to the drawings, wherein:

FIG. 2 shows an upper rail of an adjusting device for longitudinal adjustment of a vehicle seat according to the present invention;

FIG. 3 shows the upper rail of FIG. 2 in a side view without the adjustable end stop (adjustable tab);

FIG. 4e shows this tab (end stop) in a perspective side view;

Throughout the drawings, like reference numerals designate identical or technically equivalent elements or groups of elements.

DETAILED DESCRIPTION OF PREFERRED EMBODIMENTS

Figure 1A:
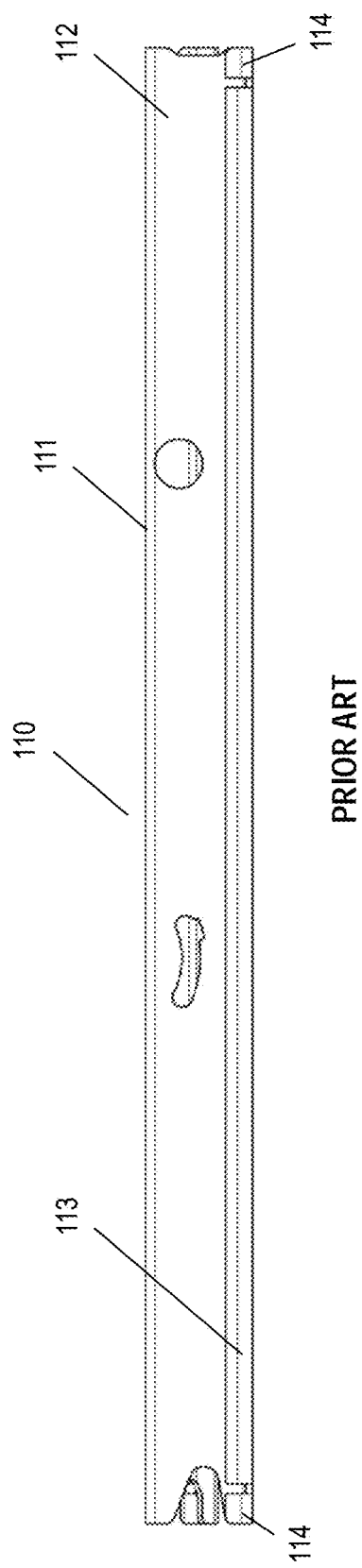
FIG. 1a shows the upper rail of a conventional adjusting device for longitudinal adjustment of a vehicle seat.
Figure 1B:
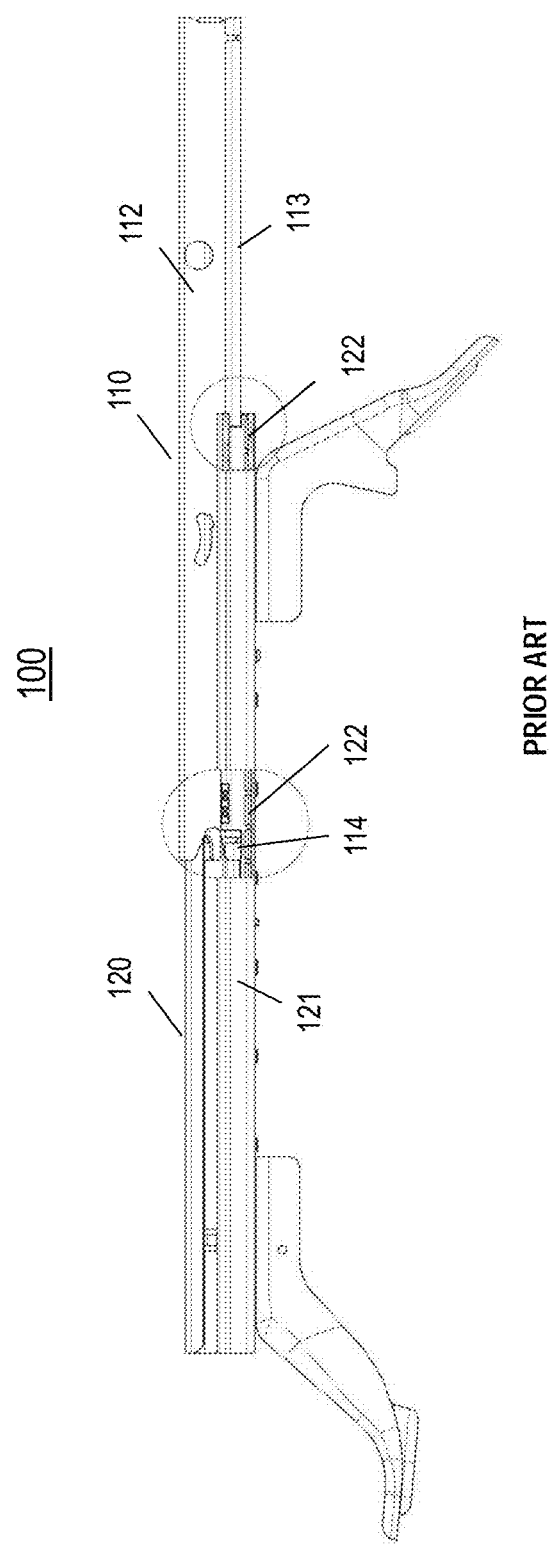
FIG. 1b shows a conventional adjusting device for longitudinal adjustment of a vehicle seat.

FIG. 2 shows a second rail 1 (hereinafter upper rail) of an adjusting device for longitudinal adjustment of a vehicle seat according to the present invention in a perspective view. As also shown in FIG. 5b, the upper rail 1 is substantially inverse U-shaped and comprises a base leg 10 (bottom) and an L-leg 11 projecting substantially perpendicularly from the base leg 10. The L-leg 11 is adjoined with a horizontal third connecting leg 16, which is followed by a bearing leg 17, which represents a second end portion of the upper rail 1 and extends under an acute angle upward and toward the interior of the upper rail 1. On the opposite side, a first connecting leg 12 extends substantially perpendicularly to the base leg 10 and in parallel with the opposite L-leg 11. The first connecting leg 12 is followed by a second connecting leg 13, which extends under an acute angle downward and toward the outer side of the upper rail. The second connecting leg 13 is followed by a bending portion 14 and a first end portion 15, which is semi-circularly curved in correspondence with the radius of curvature of steel balls (not shown) to be supported.

Figure 7:
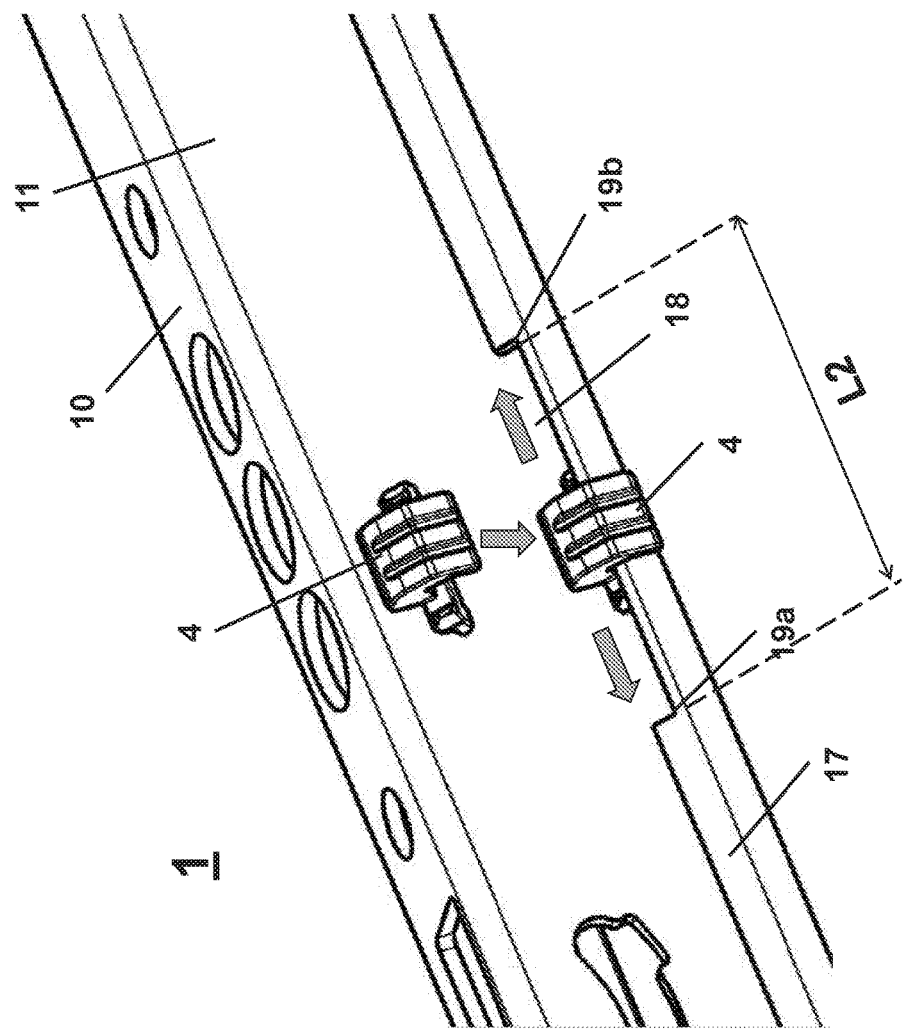
FIG. 7 is an enlarged perspective view of the central recess and of the (end stop) tab accommodated therein of the upper rail of the adjusting device for longitudinal adjustment of a vehicle seat according to the present invention.

As shown in FIGS. 2 and 3, a rectangular recess 18 is formed in a central region of the bearing leg 17 at the bottom rim of upper rail 1. For the purpose of the present application the length of recess 18 in longitudinal direction is considered to be L2, as indicated in FIGS. 3 and 7. More specifically, the recess 18 extends mirror-symmetrically relative to the geometric middle of upper rail 1 in longitudinal direction towards the front and rear end of upper rail 1. In the vertical direction the recess 18 does not extend over the entire height of bearing leg 17, but extends e.g. over half the height thereof, so that the mechanical stability of bearing leg 17 is not significantly diminished. As shown in FIG. 3, the recess 18 has a vertical rear edge 19a and vertical front edge 19b, which serve for defining extreme positions of an end stop, as outlined below in more detail.

Figure 4B:
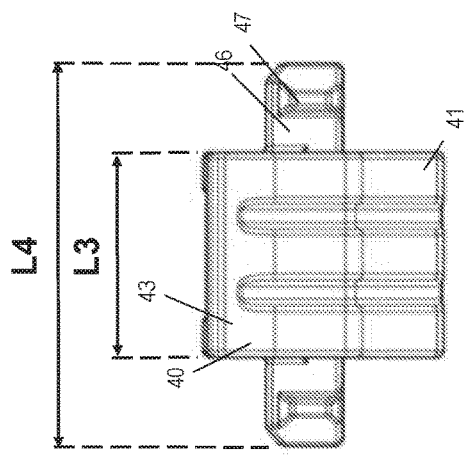
FIGS. 4a-4d show the tab (end stop) of an adjusting device for longitudinal adjustment of a vehicle seat according to the present invention in a perspective view, in side views and in a cross-sectional view.
Figure 4D:
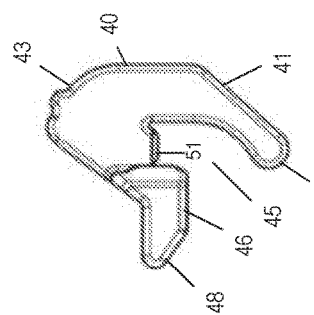

FIGS. 4a-4d show an end stop 4, which is supported in recess 18, as outlined below in more detail. Overall, the end stop 4 is hook-shaped, if viewed in profile, and comprises a base member 40 and an opposite bearing surface 46, which are spaced apart from each other so that a guiding channel 45 is formed therebetween, as shown in FIG. 4d. More specifically, the base member 40 is followed by a slanted bearing leg 41, which is followed by a thickened, curved embracing portion 42. On the opposite end, the base member 40 is followed by a V-shaped connecting leg 43, which connects with the opposite bearing surface 46. As shown in FIG. 5b, in use the bottom edge of recess 18 of bearing leg 17 of upper rail 1 is positively accommodated in the guiding channel 45 of end stop 4.

The front and rear side walls 44 of end stop 4 extend exactly transverse to the longitudinal direction of end stop 4 and thus may serve as stop surfaces for limiting the travel range of the adjusting device, as outlined below in more detail. For this purpose, the front and rear side walls 44 of end stop 4 may also be covered or lined with a metal sheet.

As can be concluded from FIGS. 2 and 4d, the end stop 4 is positively mated to the bearing leg 17 of upper rail 1. When the hook-shaped end stop 4 is mounted on the bearing leg 17 of upper rail 1, the bearing surface 46 is supported on the inner surface of bearing leg 17. At the same time, the V-shaped connecting leg 43 extends through recess 18 of bearing leg 17, whereas the inner surface of base member 40 rests against the outer surface of bearing leg 17. At the same time, the thickened curved embracing portion 42 corresponds to the outer contour of bearing leg 17 at its bottom end, where it is curved to be followed by the third connecting leg 16. Overall, the end stop 4 positively grips behind bearing leg 17 to be stably supported thereon.

As shown in FIG. 5b, the slanted front end 48 of bearing surface 46 extends under an acute angle relative to bearing surface 46, which corresponds to the acute angle of bearing leg 17 relative to the third connecting leg 16. Thus, a uniform contact of the front end 48 to the upper surface of third connecting leg 16 is ensured to enable a mechanically stable support of end stop 4 on bearing leg 17.

Figure 4A:
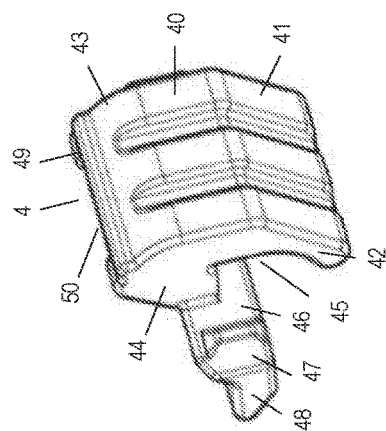

The friction pairing of the materials of bearing leg 17 (usually steel) and end stop 4 (preferably plastic or resin) may be sufficient to enable a displacement of end stop 4 along bearing leg 17 in longitudinal direction at low friction. Depending on the force of the positive-fit of end stop 4 on bearing leg 17, however, additional measures might be necessary to further reduce friction in this area. For this purpose, protrusions 47 and 51 may be provided on the inner surface of bearing surface 46 and V-shaped connecting leg 43, as shown in FIGS. 4a and 4d. Preferably, the protrusion 51 is disposed exactly in the geometrical middle of end stop 4, if viewed in longitudinal direction, whereas protrusions 47 are disposed mirror-symmetrically with respect to central protrusion 51. Thus, a three-point support of end stop 4 on the edges of recess 18 of bearing leg 17 may be accomplished.

Further, as shown in the perspective view of FIG. 4e, a plurality of protrusions 51 may be formed on the inner surface of guiding channel 45, which are aligned along the longitudinal direction, wherein grooves 52a are formed in between these protrusions 51, which serve as grease retaining pockets 52a for accommodating grease or a lubricant to further reduce friction between the end stop 4 and the associated surface of the upper rail 1, i.e. of the bearing leg 17. Further, also on the outer surface of slanted bearing leg 41 a plurality of grooves or recesses 52b may be provided, which may also serve as grease retaining pockets 52b for accommodating grease or a lubricant to further reduce friction between the end stop 4 and the associated opposite surface of the lower rail 2, i.e. the inner surface of the second end portion 29 of lower rail 2.

As will become apparent to the person skilled in the art, in comparison to the configuration shown in FIGS. 4a-4d the bearing surface 46 may also be extended both in forward and rearward longitudinal direction beyond the edges of central base member 40, if viewed in longitudinal direction, as shown in FIGS. 4a-4d.

Figure 4C:
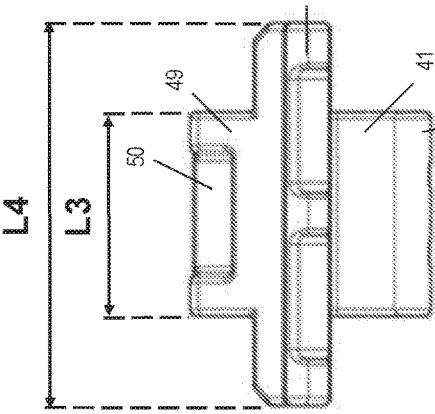

As indicated in FIGS. 4b and 4c, the total length of central base member 40 is defined as L3, whereas the total length of the end stop 4 itself is defined as L4, as defined by the distance between the ends of the extensions of bearing surface 46 in longitudinal direction. For embodiments, where such extensions should not be provided, the lengths L3 and L4 are identical.

As shown in FIGS. 4a and 4c, protruding ribs and intermediate recesses may be provided on the outer surface of base member 40, slanted bearing leg 41 and V-shaped connecting leg 43, which helps to further reduce friction with the opposite inner surface of the lower rail, as shown in the cross-sectional view of FIG. 5b.

For a more precise and stable support of end stop 4 on bearing leg 17, the bearing surface 46 extends mirror-symmetrically beyond the edges of central base member 40, if viewed in longitudinal direction.

Figure 5A:
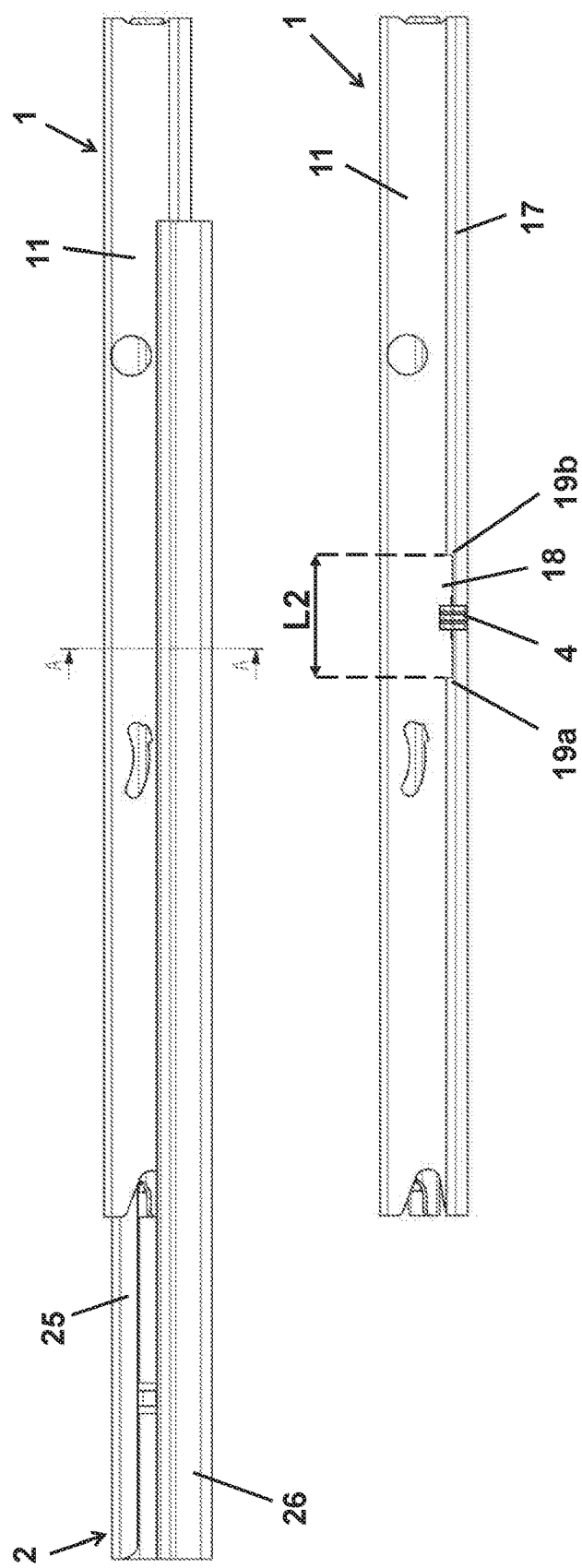
FIG. 5a shows an adjusting device for longitudinal adjustment of a vehicle seat according to the present invention (upper part) and the upper slide rail of this adjusting device in a side view.
Figure 5B:
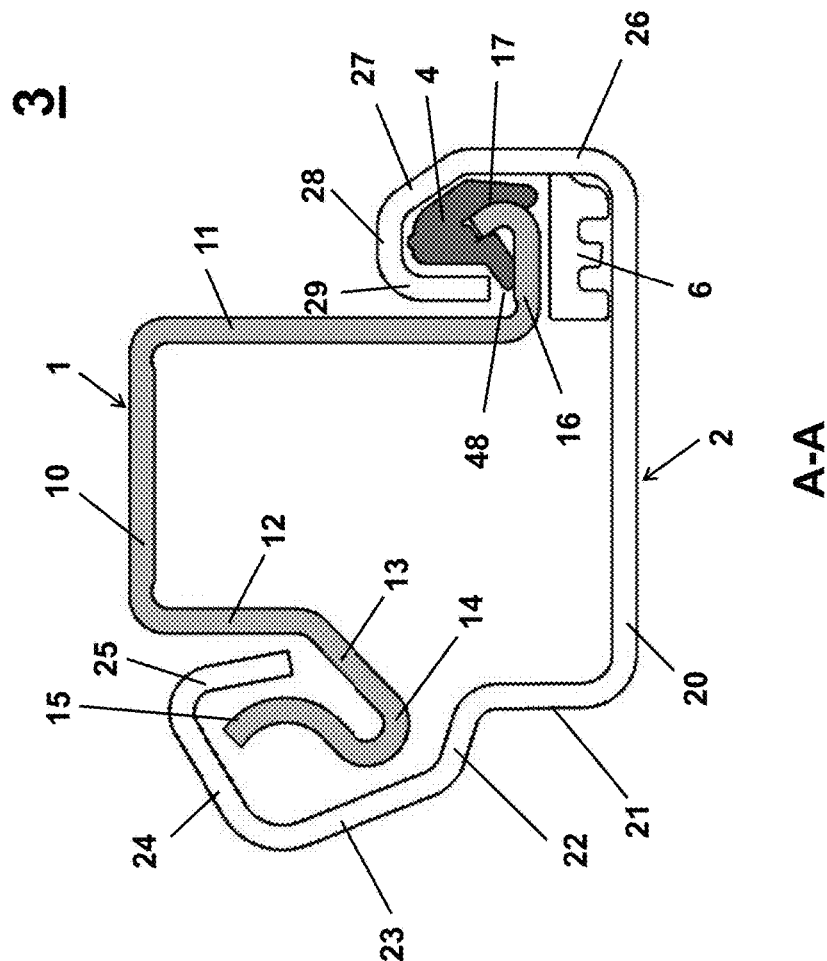
FIG. 5b is a cross-sectional view of the slide rails of the adjusting device for longitudinal adjustment of a vehicle seat according to the present invention.

As shown in FIGS. 5a and 5b, end stop 4 is clipped or hooked onto the bottom edge of recess 18 of bearing leg 17 such that end stop 4 positively grips behind bearing leg 17 and can be displaced along the longitudinal direction. This is also shown in greater detail in the enlarged perspective view of FIG. 7.

Upper rail 1 is mounted on lower rail 2 so as to be displaceable in longitudinal direction along lower rail 2. As shown in FIG. 5b, lower rail 2 is substantially U-shaped and comprises a base leg 20 (bottom) and an L-leg 21 projecting substantially perpendicularly and upward from the base leg 20. The L-leg 21 is adjoined with a slanted first connecting leg 22, which extends outwards from lower rail 2, preferably inclined upward, which is followed by a second connecting leg 23, which extends under an acute angle outwards and upwards relative to base leg 20, and a third connecting leg 24, which extends under an acute angle inwards and upwards relative to base leg 20, and is finally followed by the first end portion 25, which extends downward, toward base leg 20 and into the gap between the first connecting leg 12 of upper rail 1 and the opposite first end portion of upper rail 1. Steel balls (not shown) serving as bearing members are supported by the semi-circular curved end portion 15 of upper rail 1 and the opposite corner region between second connecting leg 23 and third connecting leg 24 of lower rail 2.

On the opposite side, a fourth connecting leg 26 extends substantially perpendicularly to the base leg 20 and in parallel with the opposite L-leg 21. The fourth connecting leg 26 is followed by a fifth connecting leg 27, which extends under an acute angle upward and toward the inner side of the lower rail 2. The fifth connecting leg 27 is followed by a sixth connecting leg 28, which extends in parallel with horizontal base leg 20 and inward, and by the second end portion 29, which extends downward toward base leg 20 and into the gap between the bearing leg 17 and L-leg 11 of upper rail 1.

Thus, the end portions 25, 29 of the lower rail 2 embrace the corresponding end portions 15, 17 of the upper rail 1. The bearing areas, which are formed by opposite portions 15, 23/24 and 17, 27 of the upper rail 1 and lower rail 2, respectively, are thus diagonally offset to each other and biased against each other.

As shown in FIG. 5b, a retainer 6 for accommodating bearing members, such as steel balls or rollers, is disposed between the two rails 1, 2, at least near the bearing area formed by bearing leg 17. An example of such a retainer 6 (also referred to as bearing cage) is shown in FIG. 6c in a perspective side view. As shown in FIG. 6c, retainer 6 is an oblong structure, preferably of plastic material or resin, and comprises an oblong, rectangular bottom 60, in which a plurality of apertures 64 for accommodating rollers or steel balls (not shown) is formed, as well as a rear side wall 61 and a front side wall 62, in which a plurality of apertures 63 for accommodating rollers or steel balls (not shown) is formed. In profile, the oblong retainer 6 is substantially L-shaped, wherein in use, as shown in FIG. 5b, the oblong bottom 60 is disposed in the gap between base leg 20 of lower rail 2 and the third connecting leg 16 of upper rail 1, whereas the side walls 61, 62 are mated to the shape of the gap between the upright fourth connecting leg 26 of lower rail 2 and opposite curved bottom edge of bearing leg 17 of upper rail 1 and the gap between the slanted fifth connecting leg 27 of lower rail 2 and the slanted front end of bearing leg 17.

As shown in FIG. 6c, a rectangular recess or window 65 is formed between the rear side wall 61 and front side wall 62 of retainer 6. For the purpose of the present application the length of recess 65 in longitudinal direction of retainer 6 is considered to be L1, as indicated in FIG. 6c. In use the end stop 4 extends both through the recess 18 formed in bearing leg 17 of upper rail 1 and through the window or recess 65 of retainer 6, as shown in the cross-sectional view of FIG. 5b. Thus, by cooperation of end stop 4 with the edges of recess 18 of bearing leg 17 and the edges of recess 65 of retainer 6, the most forward and most backward position of upper rail 1 relative to lower rail 2 can be defined.

Because the recess 18 in bearing leg 17 extends over a certain length (L2) in longitudinal direction, and because the end stop 4 can be displaced along recess 18 in bearing leg 17, according to the present invention the normal travel range of upper rail 1 relative to lower rail 2, which conventionally corresponds to length L1 of the recess 65 of retainer 6, as indicated in FIG. 6c, can be extended substantially to an overall travel length of L1−L4+L2−L3, using the definitions of lengths L1 to L4 introduced above.

Figure 6A:
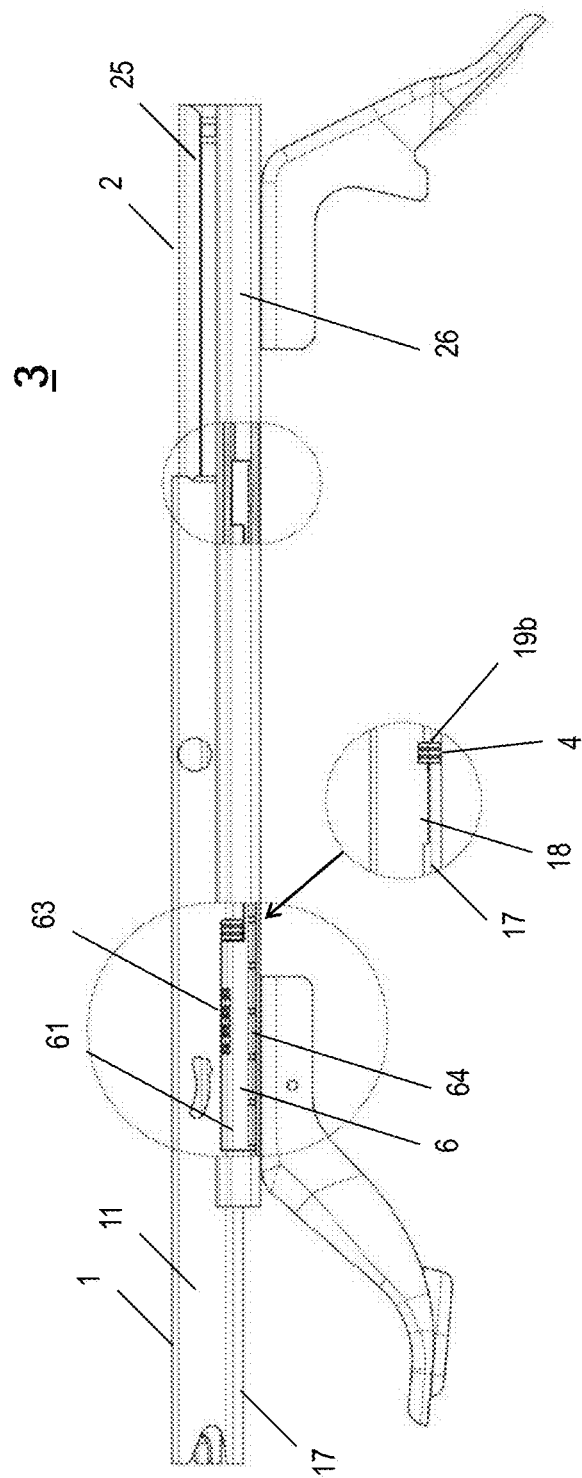
FIGS. 6a-6b show the adjusting device for longitudinal adjustment of a vehicle seat according to the present invention in a full rear end position and in an extended full forward position.

In the full rear end position of adjusting device 3 shown in FIG. 6a an end surface of bearing surface 46 of end stop 4 abuts against the rear side wall 61 of retainer 6 and an end surface of the central base member 40 of end stop 4 abuts against front edge 19b of recess 18 of bearing leg 17 of upper rail 1, to thereby define the full rear end position of adjusting device 3.

Figure 6B:
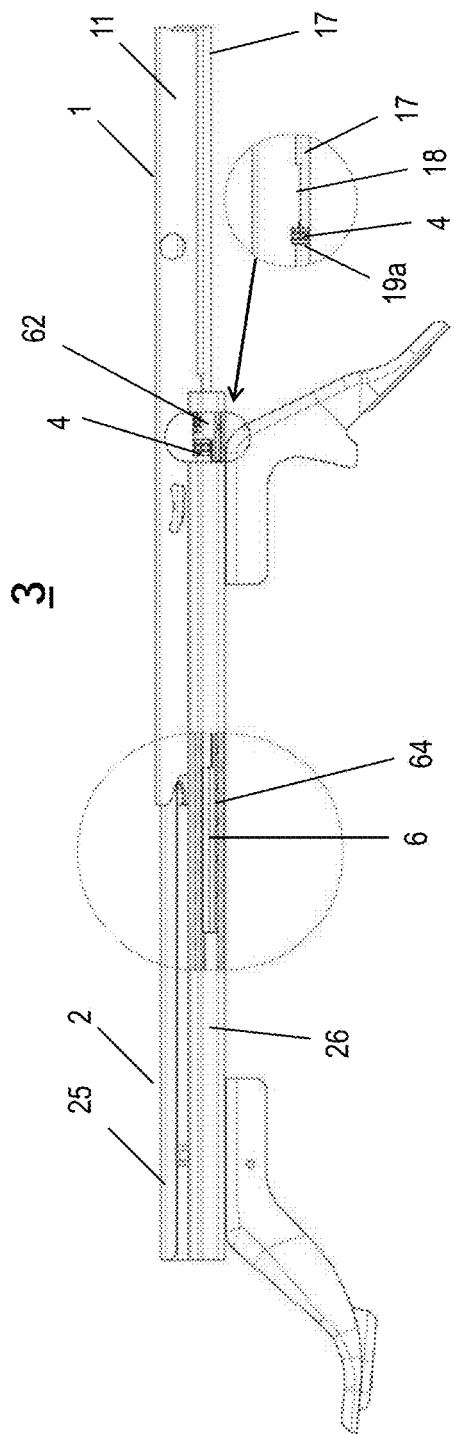
Figure 6C:
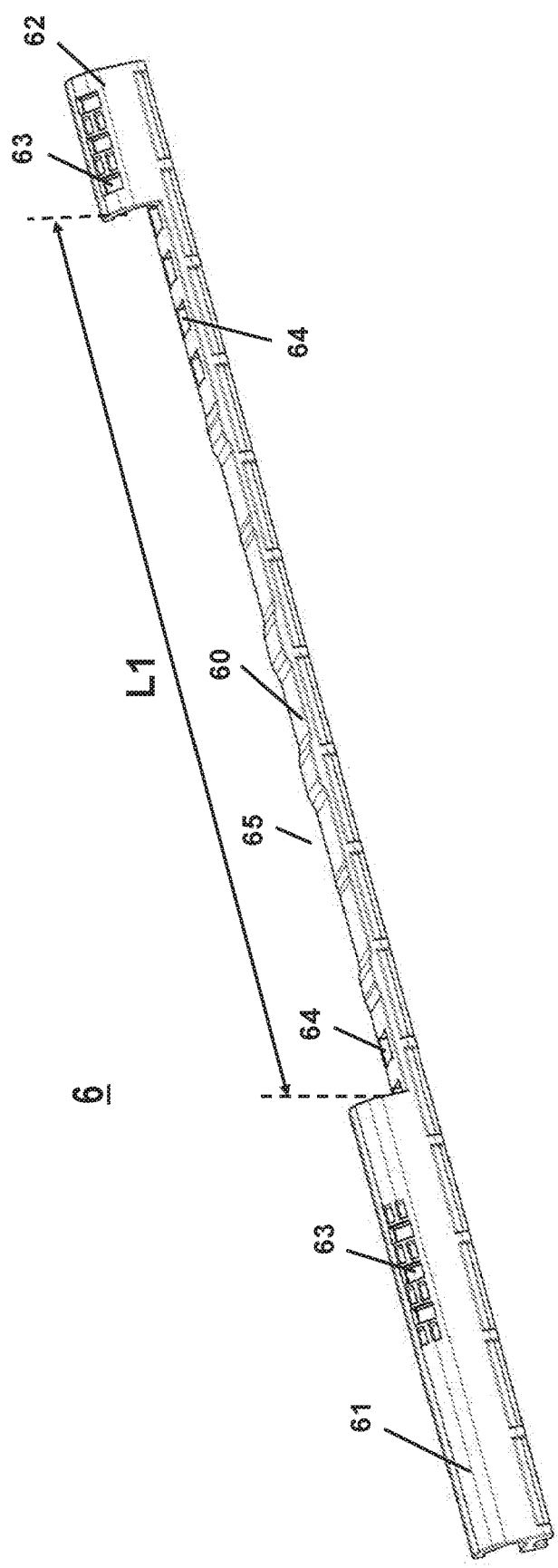
FIG. 6c shows a retainer of the adjusting device for longitudinal adjustment of a vehicle seat according to the present invention.

In the extended full forward position of adjusting device 3 shown in FIG. 6b an end surface of bearing surface 46 of end stop 4 abuts against the front side wall 62 of retainer 6 and an end surface of the central base member 40 of end stop 4 abuts against rear edge 19a of recess 18 of bearing leg 17 of upper rail 1, to thereby define the extended full forward end position of adjusting device 3. The retainer cage 6 is fixed relative to upper rail 1 after reaching end stop 4 in lower rail 2.

During adjustment of the adjusting device 3 from its first extreme position to its opposite second extreme position, the end stop 4 will travel along the entire recess 18 in bearing leg 17, over a distance which basically corresponds to length L2−L3.

Referring to FIGS. 7, 6a and 5b, for assembly of an adjusting device as outlined above, in a first step a first (e.g. lower) rail 2, a second (e.g. upper) rail 1 and an oblong retainer 6 for accommodating bearing members (not shown) are provided. The lower rail 2 is then slightly expanded by means of a mounting device (not shown) so that the upper rail 1 together with the oblong retainer 6, possibly together with bearing members accommodate therein, if required, can be inserted in longitudinal direction into expanded lower rail 2, until about half of the length of the upper rail 1 and oblong retainer 6 is inserted.

In this stage, the hook-shaped end stop 4 is inserted into the recess 65 of the oblong retainer and moved toward the recess 18 in bearing leg 17, where it is then lowered from above, as indicated schematically in FIG. 7 by the arrows, so as to be clipped or hooked onto the bottom edge of recess 18 of bearing leg 17.

Then the upper rail 1 together with the oblong retainer 6 and the end stop 4 are further inserted in longitudinal direction into lower rail 2, until end stop 4 is fully inserted into lower rail 2.

At this stage the mounting device may release the lower rail 2 so that the slightly expanded lower rail 2 contracts again to its home position.

Finally, the upper rail 1 together with the oblong retainer 6 and the end stop 4 are further inserted in longitudinal direction into lower rail 2. If the friction between upper rail 1 and lower rail 2 should be too high for inserting the upper rail 1 together with the oblong retainer 6 and the end stop 4 further into lower rail 2 at this stage, the mounting device can, of course, be released at a later stage of the assembly procedure.

As will become apparent to the person skilled in the art, additional method steps, such as providing additional end stops or bending of such end stops, are not required in a method according to the present invention.

Traditionally the lower and upper rails would be extended to accommodate the travel range of an adjusting device, where outer ends of the retainer cage are used as stops cooperating with stationary end stops. In order to accomplish a longer longitudinal travel range using the same upper and lower rail lengths, according to the present invention an adjustable upper rail center tab is clipped into a defined channel on the upper rail which simulates the conventional end stop. The adjustable center tab will only make contact with the roller cage during the initial cycle (during assembly of the adjusting device) and whenever the adjusting device reaches either extreme position. When the adjusting device according to the present invention reaches either extreme position the adjustable upper rail center tab will make contact with the retainer cage and adjust accordingly via sliding in the opposite direction creating additional clearance for the retainer cage. Because the center tab can slide and be displaced forward and rearward entering into a sliding/skidding state of the retainer cage can be prevented efficiently.

In comparison to conventional adjusting devices, for the same lengths and dimensions of the upper and lower rails, an increase of about 30% in vertical stability as well as a significantly higher mechanical strength in full forward position (measured with belt anchorage testing) and in the event of a frontal or side impact (e.g. front or side crash) and a much higher durability (particularly because of less skidding) of the adjusting device can be accomplished.

As will become apparent to the person skilled in the art, the above adjusting device may of course be combined with a conventional "easy entry" mechanism, such as the mechanism of the Applicant disclosed in U.S. Pat. No. 7,097,250 B2, to thereby further extend the travel range of the adjusting device.

While it has been described above that the end stop is supported displaceably on the upper rail, it will become apparent to the person skilled in the art that in a technically equivalent manner the end stop may also be supported displaceably on the lower rail, e.g. in a recess formed on the inner surface of fourth connecting leg 26 of lower rail 2 (see FIG. 5b).

LIST OF REFERENCE NUMERALS 1 upper rail
2 lower rail
3 rail/adjusting device for longitudinal adjustment
4 displaceable end stop/tab
6 retainer
10 base leg
11 L-leg
12 first connecting leg
13 second (slanted) connecting leg
14 bending portion
15 first end portion
16 third connecting leg
17 second end portion/bearing leg
18 recess
19a rear edge of recess 18
19b front edge of recess 18
20 base leg
21 L-leg
22 first (slanted) connecting leg
23 second (slanted) connecting leg
24 third connecting leg
25 first end portion
26 fourth connecting leg
27 fifth connecting leg
28 sixth connecting leg
29 second end portion
40 base member
41 slanted bearing leg
42 embracing portion
43 connecting leg
44 side wall/stop surface
45 guiding channel
46 bearing surface
47 protrusion
48 slanted front end
49 protrusion
50 recess
51 protrusion
52a grease retaining pocket
52b grease retaining pocket
60 bottom
61 rear side wall
62 front side wall
63 upper recess
64 bottom recess
65 recess in retainer 6
100 rail/adjusting device for longitudinal adjustment
110 upper rail
111 base leg
112 side wall
113 bearing area
114 end stop
120 lower rail
121 bearing area
122 retainer

What is claimed is:

1. An adjusting device for longitudinal adjustment of a vehicle seat, comprising:
   a first rail and a second rail, the second rail being movably guided in a longitudinal direction relative to the first rail, and
   an end stop for defining a front end position and/or a rear end position of the second rail relative to the first rail, wherein
   the second rail is an upper rail of the adjusting device and comprises a base leg, an L-leg projecting substantially perpendicularly from the base leg, a connecting leg, which projects therefrom and extends in parallel with the base leg and a bearing leg, which extends relative to the connecting leg under an acute angle and towards an interior of the rail,
   a lateral bearing area of the second rail is formed by the bearing leg of the second rail, and
   a recess is formed in the bearing leg of the second rail, said recess extending in the longitudinal direction, wherein
   the end stop is supported in the recess, and
   the end stop positively grips behind the bearing leg of the second rail so as to be displaceably supported on the second rail in the longitudinal direction along said recess, for defining the front end position and/or rear end position of the second rail by cooperation of the end stop with an edge of said recess, wherein
   an oblong retainer for accommodating bearing members is disposed between the first rail and the second rail,
   the oblong retainer is supported so as to be displaceable in the longitudinal direction, and
   the front end position and/or rear end position of the second rail is further defined by cooperation of the end stop with the oblong retainer.

2. The adjusting device for longitudinal adjustment of a vehicle seat as claimed in claim 1, wherein the recess is formed in a central region of the adjusting device and extends in the longitudinal direction, and wherein the end stop is provided in the central region of the adjusting device and extends transverse to the longitudinal direction in a gap between the first rail and the second rail.

3. The adjusting device for longitudinal adjustment of a vehicle seat as claimed in claim 1, wherein the end stop comprises a base member and a supporting surface spaced apart from each other, for forming a guide channel, wherein the base member is formed corresponding to the bearing leg of the second rail.

4. The adjusting device for longitudinal adjustment of a vehicle seat as claimed in claim 3, wherein the base member comprises a slanted connecting leg and an embracing portion, for embracing an edge of the recess.

5. The adjusting device for longitudinal adjustment of a vehicle seat as claimed in claim 3, wherein protrusions are formed on the supporting surface and/or on a bottom of the guide channel, for reducing friction between the end stop and the bearing leg.

6. The adjusting device for longitudinal adjustment of a vehicle seat as claimed in claim 3, wherein a plurality of protrusions are formed on an inner surface of a guiding channel, which are aligned along the longitudinal direction, wherein grooves are formed in between these protrusions for accommodating grease or a lubricant to further reduce friction between the end stop and the bearing leg.

7. The adjusting device for longitudinal adjustment of a vehicle seat as claimed in claim 6, wherein the end stop is integrally formed of a resin or plastic material.

8. The adjusting device for longitudinal adjustment of a vehicle seat as claimed in claim 1, wherein the oblong retainer comprises a retainer recess extending in the longitudinal direction, for defining the front end position and/or the rear end position of the second rail by cooperation with the end stop.

9. The adjusting device for longitudinal adjustment of a vehicle seat as claimed in claim 7, wherein the oblong retainer comprises a front side wall and a rear side wall, said retainer recess being formed between the front side wall and the rear side wall, wherein the length of the retainer recess corresponds to a maximum travel range of the second rail relative to the first rail.

10. The adjusting device for longitudinal adjustment of a vehicle seat as claimed in claim 8, wherein the oblong retainer does not extend beyond a front edge or rear edge of the first rail or second rail in any of the end positions of the second rail.

11. An adjusting device for longitudinal adjustment of a vehicle seat, comprising:
 a first rail and a second rail, which second rail is movably guided in a longitudinal direction relative to the first rail, and
 an end stop for defining a front end position and/or a rear end position of the second rail relative to the first rail, wherein
 a recess is formed in the second rail or in the first rail, said recess extending in the longitudinal direction and having a rear edge and a front edge,
 the end stop is formed as a part separate to the first rail and second rail, which is not fixed to the first rail or second rail, and
 the end stop is supported on the second rail or on the first rail by a positive-fit and is displaced in the recess in the longitudinal direction and relative to the first rail or to second rail by movement of the second rail relative to the first rail, so that
 the front end position and/or the rear end position of the second rail relative to the first rail is defined by cooperation of the end stop with the first rail or with the second rail and with one of the rear edge and front edge of the recess,
 wherein the recess is formed in a sidewall of a lateral bearing area of the second rail,
 wherein the recess extending in the longitudinal direction is formed in a lateral bearing area of the second rail and a first end stop positively grips behind the lateral bearing area of the second rail so as to be displaceably supported on the second rail, and
 wherein the second rail is an upper rail of the adjusting device and comprises a base leg, an L-leg projecting substantially perpendicularly from the base leg, a connecting leg, which projects therefrom and extends in parallel with the base leg and a bearing leg, which extends relative to the connecting leg under an acute angle and towards an interior of the rail,
 the lateral bearing area of the second rail is formed by the bearing leg of the second rail, and
 the first end stop positively grips behind the bearing leg.

12. The adjusting device for longitudinal adjustment of a vehicle seat as claimed in claim 11, wherein the recess is formed in a central region of the adjusting device and extends in the longitudinal direction, and wherein the end stop is provided in the central region of the adjusting device and extends transverse to the longitudinal direction in a gap between the first rail and the second rail.

13. The adjusting device for longitudinal adjustment of a vehicle seat as claimed in claim 11, wherein
 an oblong retainer for accommodating bearing members is disposed between the first rail and the second rail,
 the oblong retainer is supported so as to be displaceable in the longitudinal direction, and
 the front end position and/or rear end position of the second rail is further defined by cooperation of the end stop with the oblong retainer.

14. The adjusting device for longitudinal adjustment of a vehicle seat as claimed in claim 13, wherein the oblong retainer comprises a retainer recess extending in the longitudinal direction, wherein the front end position and/or rear end position of the second rail relative to the first rail is further defined by cooperation of the end stop with the retainer recess.

15. The adjusting device for longitudinal adjustment of a vehicle seat as claimed in claim 14, wherein the oblong retainer comprises a front side wall and a rear side wall, said retainer recess being formed between the front side wall and the rear side wall, wherein the length of the retainer recess corresponds to a maximum travel range of the second rail relative to the first rail.

16. The adjusting device for longitudinal adjustment of a vehicle seat as claimed in claim 11, wherein the end stop comprises a base member and a supporting surface spaced apart from each other, for forming a guide channel, wherein the base member is formed corresponding to the bearing leg of the second rail.

17. The adjusting device for longitudinal adjustment of a vehicle seat as claimed in claim 11, wherein the end stop is integrally formed of a resin or plastic material.

* * * * *